United States Patent [19]

Harakawa et al.

[11] Patent Number: 4,980,409
[45] Date of Patent: Dec. 25, 1990

[54] AQUEOUS MATTE COATING COMPOSITION

[75] Inventors: Hiromi Harakawa; Hiroshi Inoue; Hiroyuki Negishi, all of Hiratsuka, Japan

[73] Assignee: Kansai Paint Co., Ltd., Japan

[21] Appl. No.: 419,336

[22] Filed: Oct. 10, 1989

[30] Foreign Application Priority Data

Oct. 13, 1988 [JP] Japan ................................ 63-257856

[51] Int. Cl.$^5$ ............................................. C08L 61/00
[52] U.S. Cl. .................................... 524/510; 524/511; 524/512
[58] Field of Search ....................... 524/510, 511, 512; 525/398, 101, 102, 154, 155

[56] References Cited

FOREIGN PATENT DOCUMENTS 2451987 5/1987 Japan .
1423408 2/1976 United Kingdom .

Primary Examiner—Joseph L. Schofer
Assistant Examiner—Jeffrey T. Smith
Attorney, Agent, or Firm—Fisher, Christen & Sabol

[57] ABSTRACT

Disclosed are an aqueous matte coating composition containing an aqueous dispersion (I) formed by dispersing into water (A) a water-dispersible vinyl copolymer having an acid value of 15 to 150 and a hydroxyl value of 30 to 200 and hving alkoxysilane group on its side chain and (B) a melamine resin not having complete compatibility with said vinyl copolymer (A); and an aqueous matte coating composition containing an aqueous dispersion (II) of the vinyl copolymer (A), and an aqueous dispersion (III) formed by dispersing into water (B) a melamine resin not having complete compatibility with the vinyl copolymer (A) and (C) a water-dispersible vinyl copolymer having neither alkoxysilane group nor complete compatibility with the melamine resin (B), and having an acid value of 15 to 150 and a hydroxyl value of 30 to 200.

4 Claims, No Drawings

AQUEOUS MATTE COATING COMPOSITION

BACKGROUND OF THE INVENTION (1) Field of the Invention

This invention relates to an aqueous matte coating composition.

(2) Description of the Prior Art

An aqueous coating composition has widely been used, because it uses water as a medium and is free of troubles about working atmosphere, danger of fire, and so forth. However, recent diversification in user's need shows a tendency to lose interest in feeling of metallic luster and highly demands matte coated film which provides grave feeling.

In fact, some aqueous matte coating compositions such as those prepared by incorporating an inorganic silica matte pigment or an organic fine powder of polyethylene, fluorocarbon resin or the like into the aqueous coating compositions have already been proposed.

However, the above aqueous matte coating compositions in the prior art all have such drawbacks that these coating compositions have poor stability and coated film obtained therefrom has poor durability because of sedimentation or floating of the pigment or fine powder in the aqueous coating composition.

In addition to the above aqueous matte coating compositions, a coating composition prepared by incorporating fine particles of an internally crosslinked resin thereinto has also been proposed without being practically used because it has such drawbacks that its matte effect is unsatisfactory and so forth.

Further, the present inventors proposed a process for forming a matte film by use of an anionic electrodeposition coating composition comprising a vinyl copolymer containing an alkoxysilane group as a basic resin and an amino resin as a curing agent (see Japanese Patent Publication No. 24519/87).

The aqueous matte coating composition used in the above process is such that the acrylic copolymer used as the basic resin has alkoxysilane group on its side chain and the alkoxysilane group is gradually hydrolized on water solubilization or making water dispersion to form silanol, i.e. →Si—OH and further condensation between the silanols forms →Si—O—Si← linkage, resulting in forming fine dispersion particles having an interparticle gel structure. As the result, when the fine dispersion particles are subjected to anionic electrodeposition coating, a film having a fine coarse surface is formed and even if heat-cured, the film keeps the coarse surface without forming a complete melt flow to form a good matte film, resulting in being widely used in the art.

However, application of the above aqueous matte coating composition to other coating methods such as spray coating, dip coating, brushing and the like than electrodeposition coating results in forming no fine coarse surface on carrying out coating and in providing unsatisfactory matte effects.

On the other hand, when the above aqueous matte coating composition is subjected to the above anionic electrodeposition coating, a remaining coating liquor on the film after coating causes to partly dissolve the fine coarse surface, resulting in producing uneven gloss after heat-curing. This requires a step of washing with water after carrying out electrodeposition coating. Therefore, from the standpoint of productivity, development of an electrodeposition coating composition, which does not require the step of washing with water, is highly demanded.

SUMMARY OF THE INVENTION

It is an object of the present invention to provide an aqueous matte coating composition which is capable of forming a matte film by means of any known coating methods, too, without particularly being limited to the electrodeposition coating, and of forming a coating composition with high stability and a film with high durability, and which makes it possible to omit the finishing step of washing with water when subjected to the electrodeposition coating.

Firstly, the present invention provides an aqueous matte coating composition containing an aqueous dispersion (I) formed by dispersing into water (A) a water-dispersible vinyl copolymer having an acid value of 15 to 150 and a hydroxyl value of 30 to 200 and having alkoxysilane group on its side chain and (B) a melamine resin not having complete compatibility with said vinyl copolymer (A).

Secondly, the present invention provides an aqueous matte coating composition containing an aqueous dispersion (II) of (A) a water-dispersible vinyl copolymer having an acid value of 15 to 150 and a hydroxyl value of 30 to 200 and having alkoxysilane group on its side chain, and an aqueous dispersion (III) formed by dispersing into water (B) a melamine resin not having complete compatibility with the vinyl copolymer (A) and (C) a water-dispersible vinyl copolymer having neither alkoxysilane group nor complete compatibility with the melamine resin (B), and having an acid value of 15 to 150 and a hydroxyl value of 30 to 200.

DETAILED DESCRIPTION OF THE INVENTION:

An advantageous process for synthesizing the water-dispersible vinyl copolymer (A) having alkoxysilane group on its side chain to be used in the present invention is a process in which an alkoxysilane group-containing unsaturated monomer is copolymerized with other monomers. These monomer components include (1) an unsaturated monomer containing a polymerizable unsaturated double bond and alkoxysilane group in one molecule, (2) α, β-ethylenically unsaturated carboxylic acid, (3) a hydroxyl group-containing acrylic monomer, and (4) other radically polymerizable unsaturated monomer.

The unsaturated monomer (1) containing the polymerizable unsaturated double bond and alkoxysilane group is a monomer component by which the alkoxysilane group is introduced into the copolymer, includes, for example, unsaturated di- or trialkoxy (or alkoxyalkoxy) silane compounds such as divinyl dimethoxysilane $(CH_2=CH)_2Si(OCH_3)_2$, divinyl di-$\beta$-methoxyethoxysilane $(CH_2=CH)_2Si(OCH_2CH_2OCH_3)_2$, vinyltrimethoxysilane $CH_2=CHSi(OCH_3)_3$, vinyltriethoxysilane $CH_2=CHSi(OC_2H_5)_3$, vinyltris-$\beta$-methoxyethoxysilane $CH_2=CHSi(OCH_2CH_2OCH_3)_3$, γ-methacryloxypropyltrimethoxysilane

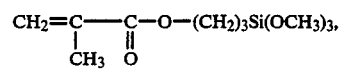

γ-methacryloxypropyltriethoxysilane

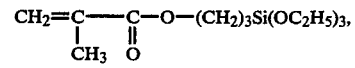

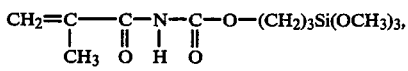

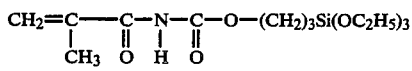

and the like. Of these, unsaturated trialkoxysilane compounds are preferred. This monomer may be used alone or in combination.

The alkoxysilane compound as the monomer component (1) is used in an amount of 0.1 to 10%, preferably 0.5 to 7% on the basis of a total weight (hereinafter on the same basis) of all the monomers. When the copolymer is water-dispersed, the alkoxysilane group causes to form →Si—O—Si← bond, resulting in increasing the molecular weight of the vinyl copolymer. When an amount of the alkoxysilane compound used is less than 0.1%, the above increase in molecular weight is not achieved with the result that a matte film having a low specular gloss is not obtained. On the other hand, when more than 10%, size of dispersed particles is so increased that sedimentation of the dispersed particles takes place and a non-uniform film is formed.

Examples of the $\alpha,\beta$-ethylenically unsaturated carboxylic acid as the monomer component (2) include acrylic acid, methacrylic acid, maleic acid, maleic anhydride, fumaric acid, crotonic acid, itaconic acid, and the like. By use of the monomer component (2), carboxyl group is introduced into the vinyl copolymer, resulting in that the copolymer is water-dispersed by neutralization. The monomer component (2) may be used alone or in combination.

The $\alpha,\beta$-ethylenically unsaturated carboxylic acid may be used in such an amount that the copolymer has an acid value of 15 to 150, preferably 20 to 100. When the acid value of the copolymer is less than 15, there is a tendency to make it difficult to form an aqueous dispersion. On the other hand, when the acid value is more than 150, water resistance of the film obtained may be reduced.

Examples of the hydroxyl group-containing acrylic monomer as the monomer component (3) include 2-hydroxyethyl acrylate, hydroxypropyl acrylate, 2-hydroxyethyl methacrylate, hydroxypropyl methacrylate and the like. By use of the above monomer, hydroxyl group is introduced into the acrylic copolymer to react with melamine resin for crosslinking reaction. The above monomer may be used alone or in combination.

The hydroxyl group-containing acrylic monomer is used in such an amount that the hydroxyl value is 30 to 200, preferably 50 to 150. When the hydroxyl value of the copolymer is less than 30, it shows poor film performance. On the other hand, when the hydroxyl value is more than 200, the film shows poor water resistance.

Other radically polymerizable unsaturated monomer as the monomer component (4) is a remaining component among monomer components for the vinyl copolymer, and may include known monomers usually used for the synthesis of vinyl copolymer, for example, $C_{1-18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and the like; vinyl aromatic monomer such as styrene, u-methylstyrene, vinyltoluene and the like; amide compounds of acrylic acid or methacrylic acid; acrylonitrile, methacrylonitrile, and the like. The above unsaturated monomer may be selected depending on the intended physical properties, and may be used alone or in combination.

Copolymerization of the above unsaturated monomers (1) to (4) may be carried out according to the known processes per se for the preparation of vinyl copolymer, for example, by use of solution polymerization process, emulsion polymerization process, suspension polymerization process, and the like. Advantageously, it is preferred to carry out according to the solution polymerization process, and it may be carried out by reacting the above four monomer components for about 1 to about 20 hours, preferably about 4 to about 10 hours at a reaction temperature of normally about 0° C. to about 180° C., preferably about 40° C. to about 170° C. in the presence of a polymerization catalyst in a suitable inactive solvent.

As the above solvent, it is desirable to use a solvent which is capable of dissolving the copolymer being produced and is miscible with water so that gelation may not take place during copolymerization reaction. Examples of such a solvent used may include cellosolve solvent, carbitol solvent, glyme solvent, cellosolve acetate solvent, alcoholic solvent and the like.

Examples of the polymerization catalyst used include azo compounds, peroxide compounds, sulfides, sulfines, diazo compounds, nitroso compounds and the like.

In addition to the above processes, the vinyl copolymer having alkoxysilane group on its side chain may also be prepared by addition reaction of an epoxysilane compound such as $\gamma$-glycidoxypropyltrimethoxysilane or of an isocyanatosilane compound such as $\gamma$-isocyanatopropyltriethoxysilane to a vinyl copolymer synthesized beforehand and having carboxy group and hydroxyl group.

The vinyl copolymer (A) thus obtained has an acid value of 15 to 150, a hydroxyl value of 30 to 200 and a number average molecular weight of about 10,000 to 100,000, preferably about 20,000 to about 60,000. When the number average molecular weight is less than 10,000, the film formed may not show satisfactory durability. On the other hand, when the number average molecular weight is more than 100,000, viscosity of the resin is so increased that formation of uniform fine particles is made difficult on being water-dispersed.

Formation of an aqueous dispersion of the vinyl copolymer (A) may be effected by the conventional method, for example, by neutralizing a vinyl copolymer containing alkoxysilane group, hydroxyl group and carboxyl group as above obtained with amine compounds, for example, aliphatic amines such as monoethylamine, diethylamine, triethylamine and the like, alkanol amines such as diethanolamine, triethanolamine and the like, cyclic amines such as pyridine, piperidine and the like, and ammonia in an amount of 0.5 to 1.0 equivalent relative to the carboxyl group.

The melamine resin (B) used as a crosslinking agent for the water dispersible vinyl copolymer in the present invention is required to be compatible by the aid of a solvent common to both, but not to have complete compatibility in the absence of any solvent, with the copolymer (A) or the vinyl copolymer (C) (hereinafter referred to simply as the vinyl copolymer). It may be defined hereinbelow that the melamine resin does not have complete compatibility with the vinyl copolymer (A) or (C).

The vinyl copolymer (A) or (C) is formulated with melamine resin (B) in a solids weight ratio of (A) or (C)/(B) to be 40/60, an amine compound is then added in an amount of 1.0 equivalent relative to carboxyl group of the vinyl copolymer (A) or (C), and water is then added to form an aqueous dispersion having a solid content of 20% by weight. The aqueous dispersion is coated onto a transparent glass plate to a thickness of 10 $\mu$m as a dry film, followed by removing the solvent by evaporation at room temperature to 100° C., and further by drying at a temperature of 150° C. to 200° C. for 5 to 10 minutes. When the film thus formed is found hazy by the naked eye, it is defined that the melamine resin does not have complete compatibility with the vinyl copolymer (A) or (C). Further, quantitatively speaking, it may be defined that the melamine resin does not have complete compatibility with the vinyl copolymer (A) or (C) when a percentage transmittance measured on the film obtained as above at a wavelength of 4000 Å by use of a spectrophotometer is 95% or less.

The melamine resin used in the present invention has the percentage transmittance of 95% or less, preferably 90% to 50%, and has a weight average molecular weight of 400 to 4000, preferably 600 to 2500. The weight average molecular weight of the melamine resin represents one calculated in terms of polystyrene in gel permeation chromatography.

When the percentage transmittance is more than 95%, compatibility of the melamine resin with the vinyl copolymer is so increased that it is made impossible to form a matte film having a gloss of 50 or less (i.e. 60° specular reflection, and so forth).

The melamine resin (B) used in the present invention is not specifically limited so long as the above percentage transmittance is satisfied, and may be used in the form of various etherified ones such as ones modified by use of at least one of methyl alcohol, ethyl alcohol, isopropyl alcohol, n-butyl alcohol, isobutyl alcohol, octyl alcohol, 2-ethylhexyl alcohol, benzyl alcohol and the like. Those modified with alcohols having preferably $C_3$ or higher, more preferably $C_4$ to $C_{10}$ are preferred in the present invention. It is advantageous that the melamine resin contains an ether group modified by $C_3$ or higher alcohol in an amount of, on the average, at least one, preferably 2 to 4 per one nucleus of triazine ring.

The coating composition of the present invention may be prepared by mixing the melamine resin (B) with the vinyl copolymer (A), followed by dispersing into water to form an aqueous dispersion (I), or may be prepared by first mixing the melamine resin (B) with the vinyl copolymer (C) other than the vinyl copolymer (A) to form an aqueous dispersion (III), followed by mixing the aqueous dispersion (III) with an aqueous dispersion (II) of the vinyl copolymer (A). Particularly, the coating composition prepared according to the latter process is characterized by that since the vinyl copolymer (A) and the melamine resin (B) are separately dispersed into water, a matte film having a low gloss may easily be formed by known coating methods other than the electrodeposition coating method, too.

The vinyl copolymer (C) used in the present invention is prepared by copolymerizing $\alpha,\beta$-ethylenically unsaturated carboxylic acid (2), the hydroxyl group-containing acrylic monomer (3) and other radically polymerizable unsaturated monomer (4), removing the unsaturated monomer (1) from the monomer components of the vinyl copolymer (A).

The $\alpha,\beta$-ethylenically unsaturated carboxylic acid (2) is used in such an amount that the acid value of the vinyl copolymer (C) is 15 to 150, preferably 20 to 100, the hydroxyl group-containing acrylic monomer (3) is used in such an amount that the hydroxyl value is 30 to 200, preferably 50 to 150. The vinyl copolymer (C) has a number average molecular weight of 10,000 to 100,000, preferably 15,000 to 80,000.

According to the present invention, the vinyl copolymer (C) is mixed with the melamine resin (B), followed by neutralizing with an alkali and by being dispersed into water to form an aqueous dispersion (III) for use. A mixing ratio of the vinyl copolymer (C) to the melamine resin (B) is 60/40 to 5/95, preferably 50/50 to 10/90 in terms of the weight of the solid content.

The aqueous matte coating composition of the present invention may be prepared by mixing the vinyl copolymer (A) with the melamine resin (B), followed by neutralizing with an alkali and dispersing into water to form the aqueous dispersion (I), or may be prepared by mixing the aqueous dispersions (II) and (III).

The mixing ratio of the vinyl copolymer (A) to the melamine resin (B) is 95-30/5-70, preferably 90-40/10-60 as (A)/(B) in terms of the weight of solid content. When the melamine resin (B) is mixed with the vinyl copolymer (C) for using, the above mixing ratio is calculated by adding the amount of the vinyl copolymer (C) to that of the vinyl copolymer (A).

As required, pigments, dyes and additives may be added to the aqueous matte coating composition of the present invention.

The aqueous matte coating composition of the present invention may be coated onto various kinds of metal materials such as aluminum, aluminum alloy, anodized aluminum, steel; a steel sheet plated with zinc, tin, chromium, aluminum and the like; a steel sheet subjected to a chemical treatment with chromic acid or phosphoric acid, or to a cathodic electrochemical treatment; and the like. Further, the aqueous matte coating composition may be coated directly onto the metal material, or, as a topcoating, onto a film formed by coating the known undercoating and intermediate coating.

The aqueous matte coating composition of the present invention may be coated onto the surface of the above metal material by means of, for example, spray coating, electrostatic spray coating, brushing, dip coating, roll coating, electrodeposition coating and the like. The coated film thickness is normally about 5 to 100 $\mu$m, preferably about 10 to 80 $\mu$m. After coating, curing at about 100° C. to 200° C. for about 10 to 60 minutes forms a matte film.

When the electrodeposition coating is employed as the coating method, it is usually carried out under the conditions of a coating bath temperature of 15 to 35° C., a coating voltage of 80 to 350V and a treating time of 1 to 5 minutes. After the completion of the electrodeposition coating, without needing a step of washing with water, heat-curing forms an intended matte film.

The effects of the present invention are explained below.

It is guessed from the following reasons that the aqueous matte coating composition of the present invention is capable of forming a matte film by means of any known coating methods other than the electrodeposition coating, too, and makes it possible to omit the finishing step of washing with water when subjected to the electrodeposition coating.

An irregular reflection on the surface due to the formation of roughness on the surface of the film is essentially necessary for the formation of a matte film, no matter what coating method may be used, either the electrodeposition coating method or other coating methods, and further, in the case of a clear film, an irregular reflection within the film layer also acts supplementally thereto to lower its gloss.

The use of the aqueous matte coating composition of the present invention results in forming a matte film in that the incomplete compatibility of the melamine resin with the vinyl copolymer causes to produce a localization of the melamine resin within the film layer, resulting in producing irregular reflection within the film layer, and in that the formation of fine roughness due to the separation and localization of the vinyl copolymer and the melamine resin in the surface area of the film is fixed by the melt flow inhibition caused by the formation of gel particles due to the alkoxysilane group when heat cured.

It is necessary for the omission of the finishing step of washing with water in the matte electrodeposition coating method that a gloss of a non-deposited film taken out of the electrodeposition coating bath is similar to that of the film deposited by the electrodeposition coating. In connection therewith, since the aqueous matte coating composition of the present invention is capable of forming a matte film without needing the electrodeposition coating, even if a non-deposited film should remain without being subjected to the finishing step of washing with water in the electrodeposition coating, a matte film free of irregular gloss may be formed.

The present invention is explained more in detail by the following Examples and Comparative Examples, in which "part" and "%" are all by weight.

PREPARATION EXAMPLE 1

Preparation of vinyl copolymer (A) having alkoxysilane group on its side chain:

A reactor is charged with 55 parts of isopropyl alcohol and kept at 80° C., and a mixture of 15 parts of styrene, 31 parts of methylmethacrylate, 19 parts of n-butylacrylate, 10 parts of ethylacrylate, 15 parts of hydroxyethylacrylate, 7 parts of acrylic acid, 3 parts of γ-methacryloxypropyltrimethoxysilane (Trade name: KBM-503, marketed by Shin-Etsu Chemical Co., Ltd.) and one part of azobisdimethylvaleronitrile is then dropped thereinto over 3 hours. After the completion of the dropping procedure, the temperature is kept as above for one hour, and a mixture of one part of azobisdimethylvaleronitrile and 13 parts of butylcellosolve is then dropped, followed by reacting at 80° C. for 4 hours.

After the completion of the reaction, the solid content is controlled to 53% by use of butylcellosolve to obtain a vinyl copolymer varnish having a degree of polymerization of 100%, a number average molecular weight of about 30,000, an acid value of 53 and a hydroxyl value of 72.

PREPARATION EXAMPLE 2

PREPARATION OF MELAMINE RESIN (B)

Melamine resin (B)-1

A reactor is charged with 390 parts (one mole) of hexamethylolmelamine hexamethylether containing about 60% of the mononuclear compound, 296 parts (4 moles) of n-butanol and 0.37 part of phosphoric acid, followed by heating and reacting at 80° C. for 4 hours. After the completion of the reaction, 3.8 parts of quick lime is added to be neutralized and filtered. The filtrate is thickened under vacuum at a bath temperature of 70° C. or lower. The concentrate thus obtained is a transparent viscous liquid, and has such a structure as to have 4.3 of methyl group and 1.5 of butyl group per one of the melamine nucleus as the result of analysis by gas chromatography. As the result of the analysis by the gel permeation chromatography, a content of the mononuclear compound is 57%.

Melamine resin (B)-2

A reactor is charged with 390 parts (one mole) of hexamethylolmelamine hexamethylether containing about 70% of the mononuclear compound, 222 parts (3 moles) of n-butanol and 2 parts of 75% sulfuric acid, followed by heating and reacting at 60° C. for 4.5 hours, while the methanol by produced is properly removed out of the system under vacuum. After the completion of the reaction, an aqueous caustic soda solution is added to be neutralized and filtered. The filtrate is thickened under vacuum at a bath temperature of 70° C. or lower. The concentrate thus obtained is a transparent viscous liquid, and has such a structure as to have 3.6 of methyl group and 2.2 of butyl group per one of the melamine nucleus as the result of analysis by gas chromatography. A content of the mononuclear compound is 57% as the result of analysis by the gel permeation chromatography.

Melamine resin (B)-3

A reactor is charged with 390 parts (one mole) of hexamethylolmelamine hexamethylether containing about 60% of the mononuclear compound, 592 parts (8 moles) of n-butanol and 2 parts of 75% sulfuric acid, followed by heating and reacting at 55° C. under vacuum for 3 hours. After the completion of the reaction, the procedures in the preparation of the melamine resin (B)-2 are repeated to obtain a resin solution having 2.8 of methyl group and 3.0 of butyl group per one of the melamine nucleus and containing 57% of the mononuclear compound.

PREPARATION EXAMPLE 3

Preparation of vinyl copolymer (C)

A reactor is charged with 55 parts of isopropyl alcohol and kept at 80° C., and a mixture of 15 parts of styrene, 40 parts of methylmethacrylate, 25 parts of n-butylacrylate, 13 parts of hydroxyethylacrylate, 7 parts of acrylic acid and 1.0 part of azobisdimethylvaleronitrile is then dropped thereinto over 3 hours. After the completion of the dropping procedure, the temperature is kept as above for one hour and a mixture of one part of azobisdimethylvaleronitrile and 13 parts of butylcellosolve is dropped, followed by reacting at 80° C for 4 hours.

After the completion of the reaction, the solid content is controlled to 53% by use of butylcellosolve to obtain an acrylic copolymer varnish having a degree of polymerization of 100%, a number average molecular weight of 30,000, an acid value of 53 and a hydroxyl value of 62.

EXAMPLE 1

A uniform mixture of 132 parts of the vinyl copolymer (A) obtained in Preparation Example 1, triethylamine in an amount of 0.8 equivalent to the carboxyl group in the copolymer and 30 parts of the melamine resin (B)-1 is formed. Deionized water is added to the above mixture so that the solid content may be 12% to obtain an aqueous matte coating composition for use in the electrodeposition coating. The aforementioned percentage transmittance in this case is 95%.

The electrodeposition coating composition thus obtained is charged in an electrodeposition coating bath and is coated onto an anodized aluminum alloy plate as an anode by carrying out the electrodeposition coating under such conditions that electricity is applied thereto for 3 minutes at a bath temperature of 22° C. under such a voltage that a cured film thickness may be 10 μm to obtain a coated plate. After the completion of the electrodeposition coating, the coated plate is directly, without being washed with water, heat cured at 180° C. for 30 minutes.

The performance test results of the film thus obtained is shown in the following Table-1 along with those in other Examples and Comparative Examples.

EXAMPLE 2

The procedures of Example 1 are repeated except that the melamine resin (B)-3 is used to obtain a coated film. The aforementioned percentage transmittance in this case is 75%.

COMPARATIVE EXAMPLE 1

The procedures of Example 1 are repeated except that CYMEL 303 (Hexakismethoxymethylolmelamine resin, marketed by Mitsui Toatsu Chemicals, Inc.) is used in place of the melamine resin (B)-1 in the same amount as in the latter to obtain a coated film. The aforementioned percentage transmittance in this case is 100%.

EXAMPLE 3

To 170 parts of the vinyl copolymer obtained in Preparation Example 1 is added triethylamine in an amount of 0.5 equivalent to the carboxyl group in the copolymer (A) to be uniformly mixed, followed by adding deionized water to obtain an aqueous dispersion (S-1) having a solid content of 25%.

Separately, a uniform mixture of 66 parts of the vinyl copolymer (C) obtained in Preparation Example 3, triethylamine in an amount of 1.0 equivalent to the carboxyl group in the vinyl copolymer (C) and 65 parts of the melamine resin (B)-2 obtained in Preparation Example 2 is formed, followed by adding deionized water to obtain an aqueous dispersion (S-2) having a solid content of 30%. The aforementioned percentage transmittance in the aqueous dispersion (S-2) is 90%.

Next, 240 parts of the aqueous dispersion (S-1) and 130 parts of the aqueous dispersion (S-2) are mixed to prepare an aqueous matte coating composition having a solid content of 27%. The aqueous matte coating composition thus obtained is spray coated onto a steel sheet so that a dry film thickness may be 20 μm to 30 μm, followed by heat curing at 180° C. for 20 minutes.

EXAMPLE 4

The procedures of Example 3 are repeated except that the melamine resin (B)-2 used for the preparation of the aqueous suspension (S-2) in Example 3 is replaced by the melamine resin (B)-3 obtained in Preparation Example 2 in the same amount as the latter to obtain an aqueous matte coating composition, which is coated in the same manner as in Example 1, followed by being heat cured. The aforementioned percentage transmittance for the combination of the melamine resin (B)-3 with the vinyl copolymer (C) is 75%.

EXAMPLE 5

To the aqueous matte coating composition obtained in Example 3 is further added deionized water to prepare an electrodeposition coating composition having a solid content of 12%, followed by being subjected to the electrodeposition coating in the same manner as in Example 1 to obtain an electrodeposition film.

COMPARATIVE EXAMPLE 2

The procedures of Example 3 are repeated except that the melamine resin (B)-2 used for the preparation of the aqueous dispersion (S-2) in Example 3 is replaced by CYMEL 303 (Hexakismethoxymethylolmelamine, marketed by Mitsui Toatsu Chemicals, Inc.) used in Comparative Example 1 to obtain a cured film.

TABLE 1

| Film Performance | Ex. & Comp. Ex. Examples | | | | | Comp. Ex. | |
|---|---|---|---|---|---|---|---|
| | 1 | 2 | 3 | 4 | 5 | 1 | 2 |
| Appearance of matte film | | | | | | Δ | Δ |
| Specular reflection percentage (60°) | 40 | 15 | 10 | 8 | 15 | 60 | 70 |
| Degree of roughness of the film surface | 1.00 | 2.75 | 2.70 | 3.15 | 2.25 | 0.75 | 0.70 |
| Adhesion properties | 100 | 100 | 100 | 100 | 100 | 100 | 100 |
| Alkali resistance properties | good | good | good | good | good | good | good |

Film Performance Test Methods

Appearance of matte film:

Evaluation is carried out by the naked eye as follows.
Excellent in evenness and in soft feeling
Δ: Poor in evenness and in soft feeling
Specular reflection percentage:
Degree of gloss of the film is represented according to the 60° specular gloss defined in JIS K5400.
Degree of roughness of the film surface:
JIS B0601-1982 --- 10 points average roughness (RZ) as μm is measured by use of SURFCOM 550A (Trade name of a surface gage marketed by Tokyo Seimitsu Co., Ltd.). Adhesion properties
On the coated surface is formed 100 of 1 mm square by use of a square cutter. An adhesive cellophane tape is adhered to the squares, followed by strongly peeling the tape to observe squares remaining without being peeled off.

Alkali resistance properties

A sample is dipped in a 1% NaOH aqueous solution at 20° C. for 72 hours to observe blister, blushing, peeling, etc. of the film.

What is claimed is:

1. An aqueous matte coating composition containing an aqueous dispersion (I) formed by dispersing into water (A) a water-dispersible vinyl copolymer having carboxyl group and hydroxyl group, having an acid value of 20 to 150 and a hydroxyl value of 30 to 200 and having alkoxysilane group on its side chain, and (B) a melamine resin not having complete compatibility with said vinyl copolymer (A), said melamine resin (B) containing an ether group modified by $C_3$ or higher alcohol in an amount of 2 to 4 per one nucleus of triazine ring and not having complete compatibility with said vinyl copolymer (A) in that a percentage transmittance measured on the film from the melamine resin (B) and the vinyl copolymer (A) at a wavelength of 4000 Å by use of a spectrophotometer is 95% or less.

2. An aqueous matte coating composition containing an aqueous dispersion (II) of (A) a water-dispersible vinyl copolymer having carboxyl group and hydroxyl group, having an acid value of 20 to 150 and a hydroxyl value of 30 to 200 and having alkoxysilane group on its side chain, and an aqueous dispersion (III) formed by dispersing into water (B) a melamine resin not having complete compatibility with the vinyl copolymer (A) and (C) a water-dispersible vinyl copolymer having neither alkoxysilane group nor complete compatibility with the melamine resin (B), and having carboxyl group and hydroxyl group and having an acid value of 20 to 150 and a hydroxyl value of 30 to 200, said melamine resin (B) containing an ether group modified by $C_3$ or higher alcohol in an amount of 2 to 4 per one nucleus of triazine ring and not having complete compatibility with said vinyl copolymer (A) or (C) in that a percentage transmittance measured on the film from the melamine resin (B) and the vinyl copolymer (A) or (C) at a wavelength of 4000 Å by use of a spectrophotometer is 95% or less.

3. An aqueous matte coating composition as claimed in claim 1, wherein the percentage transmittance is 90% to 50%.

4. An aqueous matte coating composition as claimed in claim 2, wherein the percentage transmittance is 90% to 50%.

* * * * *